United States Patent Office 3,342,999
Patented Sept. 19, 1967

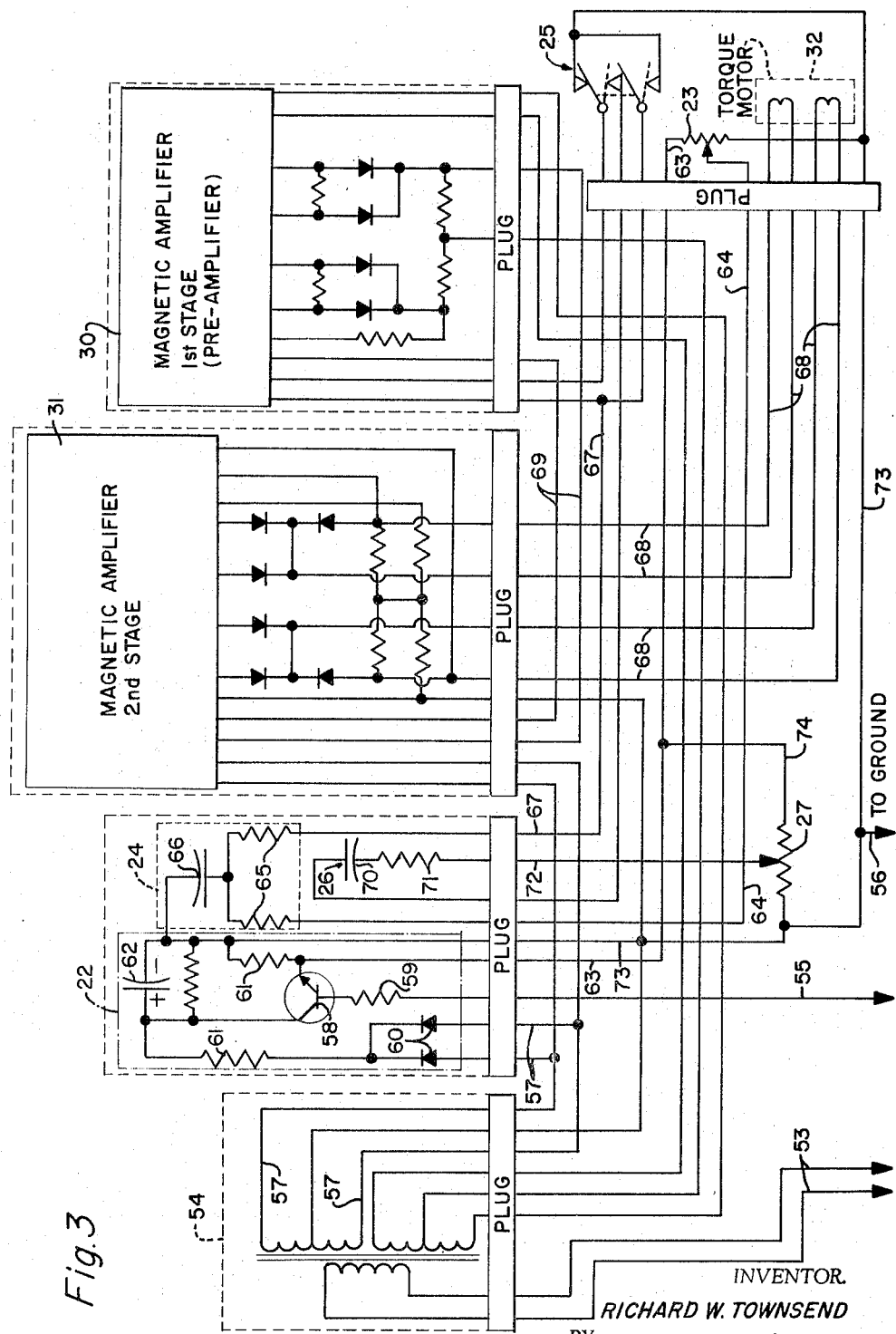

3,342,999
GOVERNOR CONTROL CIRCUIT INCLUDING A PLURALITY OF COMPENSATING NETWORKS
Richard W. Townsend, Scottsdale, Ariz., assignor to The Garrett Corporation, Los Angeles, Calif., a corporation of California
Continuation of application Ser. No. 185,711, Apr. 6, 1962. This application Oct. 11, 1965, Ser. No. 494,374
4 Claims. (Cl. 290—40)

This application is a continuation of application Ser. No. 185,711 filed Apr. 6, 1962, and now abandoned, entitled, Governor Control Circuit.

This invention relates generally to speed control mechanism for rotating machinery and especially prime movers. It is particularly concerned with an electronic governor control circuit for a turbine driven alternator which will maintain substantially constant turbine speed and alternator output, automatically sensing and compensating for transient load changes. The invention also is concerned with the provision in the governor circuit of means for adjusting droop so that the generator may be effectively used in parallel operation with other generators, if desired.

In the usual operation of a turbine driven alternator where constant frequency output is desired without the use of a static converter, the turbine is often operated with an isochronous speed control. Such controls frequently include a speed sensor which may be arranged to function with a servo system for changing the rate of feeding fuel to the engine in response to the minor variations in speed occurring during normal operation of the turbine. When there are load changes beyond these minor variations in such a system, however, there may be an undesirable time lag between the application or removal of the load and a subsequent changing of the amount of fuel fed to the turbine. This may result in an unstable condition which obviously is undesirable and inconsistent with the desired constant frequency output of the alternator. While various electronic circuits have been suggested for the elimination of this difficulty by anticipating the load changes electrically, they have not included the desired speed of response, adjustability and flexibility, and otherwise have not been entirely satisfactory in operation.

It is, therefore, the principal object of the present invention to provide an improved electronic control circuit for a turbine driven alternator which is subject to none of the difficulties encountered with prior circuits and devices of this character.

Another object of the invention is to provide an electronic control circuit, for use with an alternator driven by a turbine having an isochronous speed control with a load sensing droop trimmer, wherein the circuit includes means for accurately and quickly sensing and reacting to load changes and adjusting the turbine operation accordingly so that substantially constant frequency alternator output may be obtained.

Another object of the invention is to provide an electronic governor control circuit for a turbine driven alternator which includes means to produce a speed command for the turbine which will cause a change in speed that is substantially proportional to the shaft load imposed on the turbine.

A further object of the invention is to provide a forward loop control system for a turbine driven alternator which includes an electronic circuit for quickly and accurately detecting the magnitude of load changes and adjusting the turbine operation to compensate for such changes.

Still another object of the invention is to provide an electronic control system for a turbine driven alternator which includes a first circuit means with adjustable droop for parallel operation with other alternators and a second circuit means with adjustable load anticipation for single operation of the alternator.

Another object of the invention is to provide an electronic control system for a turbine driven alternator according to the last preceding paragraph in which the first and second circuit means are in parallel and means are provided for selecting the desired mode of operation.

It is a further object of the invention to provide an electronic control system for a turbine driven alternator which includes a real load computer or phase detector means for producing a D.C. voltage proportional to the real power output of the generator and impressing this voltage across a potentiometer so that any portion may be selected to be fed to an amplifier for subsequent action of a torque motor.

Another object of the invention is to provide an electronic control system for a turbine driven alternator which includes phase detector means for producing a D.C. voltage proportional to the output of the generator and circuit means associated with said phase detector for controlling a motor driven fuel supply for the turbine, said circuit means including an emitter follower network, a lag network, an anticipation or lead network, and means for connecting either the lag or lead network with said emitter follower network, depending upon the desired mode of operation of said alternator.

The above and other features and objects of the invention will be apparent from the following more detailed description and the accompanying drawings, in which:

FIG. 3 is a diagram of a second or remaining portion of the electronic speed control system which connects with the portion shown in FIG. 2 and completes the circuit.

Figure 1:
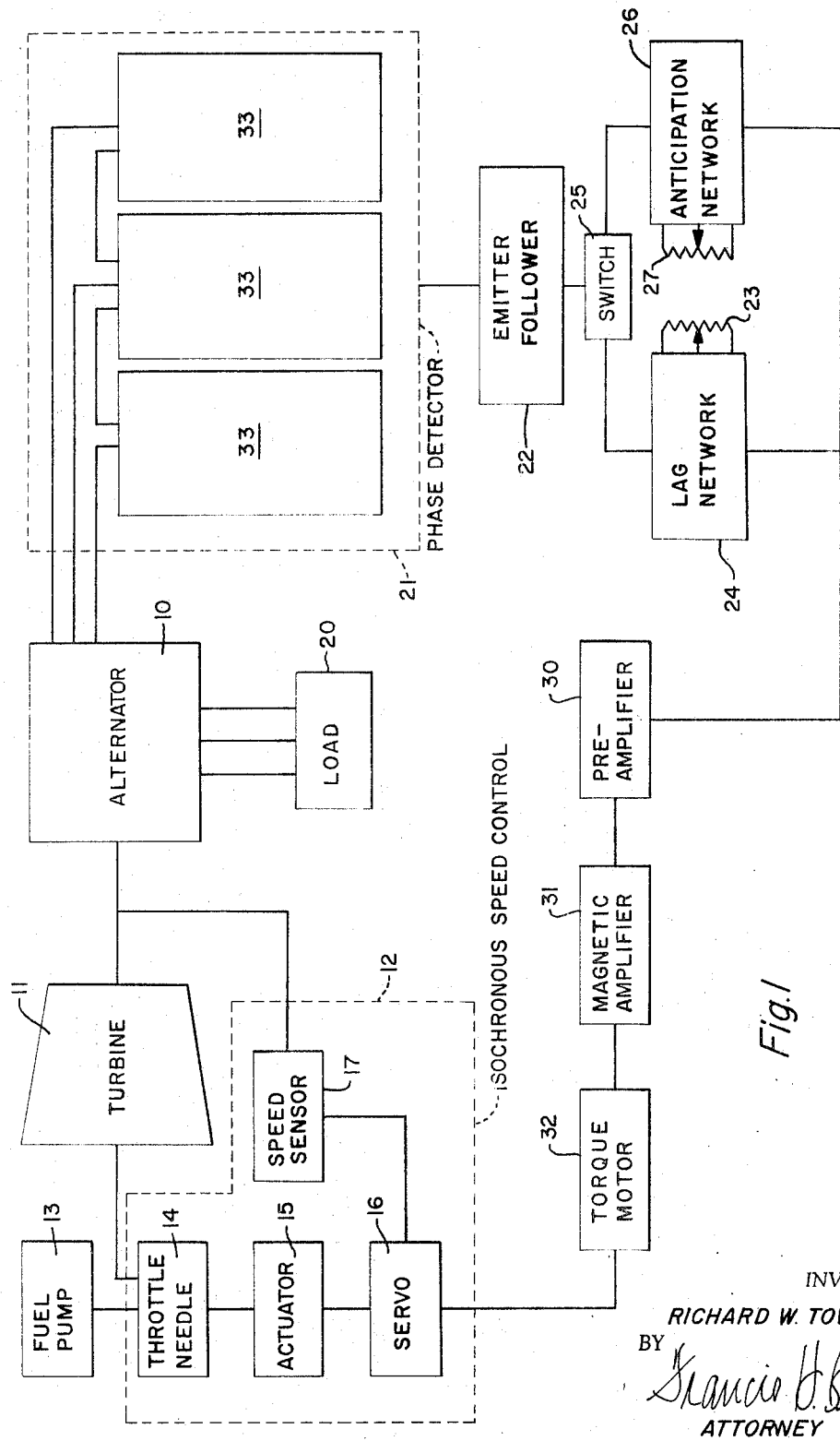
FIG. 1 is a block diagram of the principal units of an electronic speed control system embodying the features of this invention and shown associated with a turbine driven alternator.

Referring now to the drawings, and particularly FIG. 1, it will be noted that a generator 10, which in this instance is a high-speed, three-phase alternator, is arranged to be driven by a conventional gas turbine 11 equipped with an isochronous speed control 12. Such a speed control is desirable in order to obtain a substantially constant frequency output from the generator and normally may include or be operatively connected to a fuel pump 13 and a throttle needle or valve 14. The needle valve regulates the amount of fuel fed to the turbine 11 and is moved by an actuator 15 which is under the control of a suitable servo 16. A speed sensor 17, which may be operatively connected to the turbine shaft, is arranged to sense the speed of the turbine 11 and actuate the servo when the shaft speed goes above or below a set speed to reduce or add fuel to the turbine. While such an isochronous speed control is generally satisfactory for most applications, it is often desirable to control the limits of speed to a closer degree and also to sense and adjust for transient loads before such loads actually cause a reaction upon the isochronous speed control. When a load 20 is applied to a turbine driven alternator as shown in FIG. 1, if such load on the alternator causes the turbine to operate below the set speed, the speed sensor 17 will cause the servo 16 and actuator 15 to move the throttle needle 14 to increase the amount of fuel fed to the turbine. By the time the speed has thus increased to the set speed and the servo 16 stopped, the fuel feeding will normally have increased too much and the turbine will continue to increase in speed over the set speed. This will open the throttle needle the other way and begin to decrease fuel, and ultimately the cycle described may repeat and possibly produce some instability of operation. There are various methods, both mechanical and electrical, for improving stability in such a situation, but some of these are expensive and many do not have the necessary accuracy and flexibility, particularly to permit either single or parallel operation of the alternator at highest efficiency.

In accordance with the present invention, as shown diagrammatically in FIG. 1, changes in the load 20 on the alternator 10 are sensed or measured electrically and used to actuate the servo 16 and regulate the fuel supply to the turbine 11 before it has actually responded to the increased load, thereby cancelling the disturbance that would normally cause the turbine to slow down. Such action is referred to herein as "transient load anticipation" and results in substantially constant output frequency from the alternator, because with the electronic circuit embodying the features of this invention the corrective or cancelling action is, for all practical purposes, instantaneous. Electrical measurement or sensing of the changes in the load 20 on the alternator 10 is accomplished by a phase detector or real load computer 21 which is designed to produce a voltage at the output side thereof which is the sum of the real load on each phase of the alternator. This voltage signal is fed to an emitter follower 22 for suitable impedance matching, and a low impedance signal therefrom goes through a droop potentiometer 23 and lag network 24 when the alternator is connected for and used in parallel operation. If the alternator 10 is used alone or in single operation, the lag network and associated potentiometer 23 are not used, but instead the low impedance signal from the emitter follower circuit 22 is diverted by a switch 25 to a load anticipation network 26 which includes an adjustable potentiometer 27. Finally, the signal from either of the networks 24 or 26 is fed to the control of a suitable preamplifier 30 which drives a power amplifier 31 and ultimately controls the operation of a torque motor 32. Both the preamplifier or first stage 30 and the second stage or power amplifier 31 may be magnetic amplifiers, as shown in FIG. 3. The torque motor then actuates the servo 16, finally, to control the feeding of fuel to the turbine 11, as mentioned above.

Figure 2:
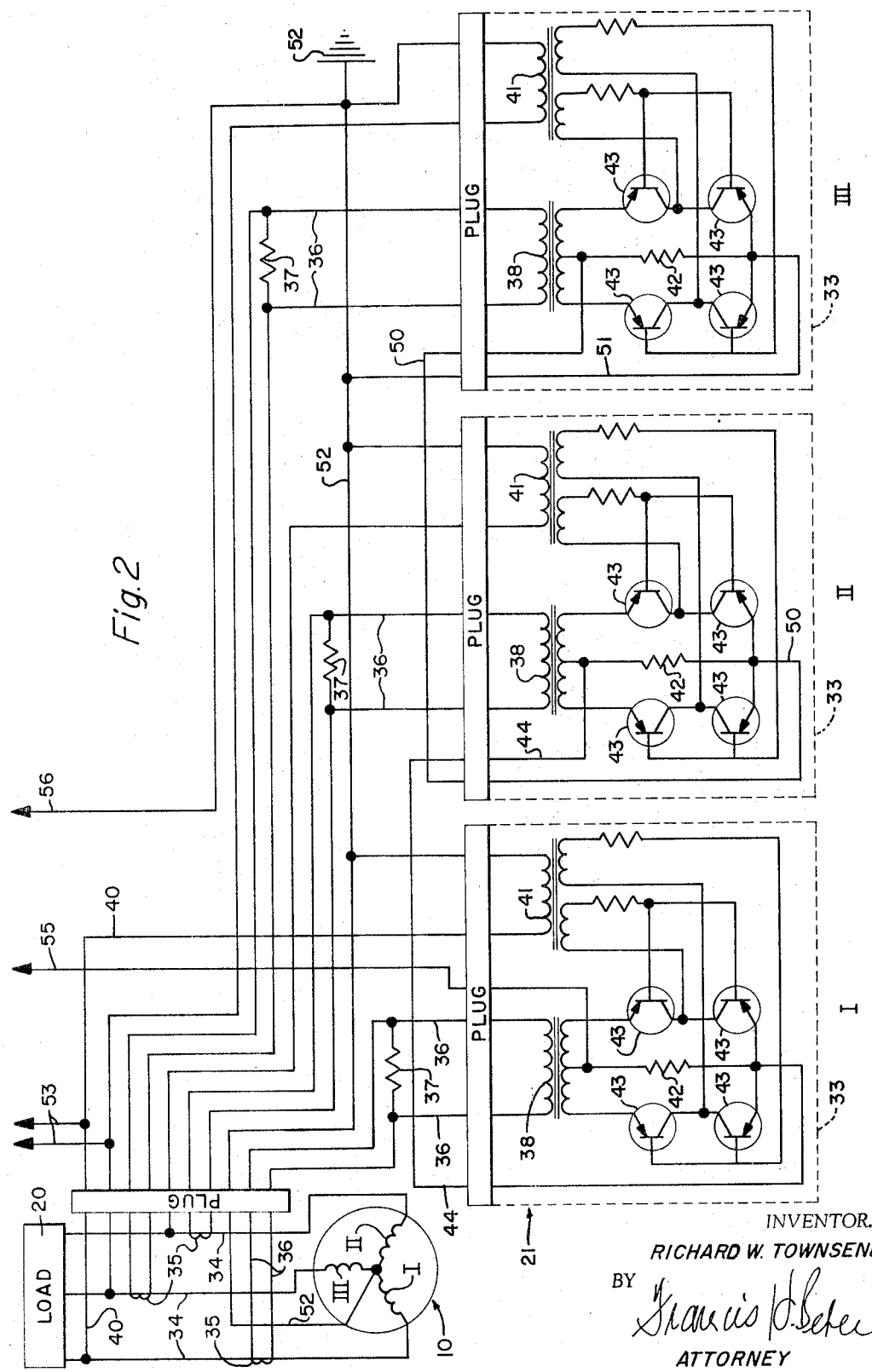
FIG. 2 is a diagram of one portion of the electronic speed control circuitry shown in the block diagram of FIG. 1.

To obtain a more complete understanding of the electronic control system and the various components and networks thereof as referred to above and shown in FIG. 1, reference may now be made to FIGS. 2 and 3. These two figures show the details of the entire electrical system and constitute one complete electrical diagram in which FIG. 2 is connected to FIG. 3, as indicated by the arrow leads at the top of FIG. 2 and the bottom of FIG. 3. In FIG. 2, the alternator 10 is shown schematically as having three phases, which are designated by the Roman numerals I, II and III, and each phase is connected to a corresponding unit 33 of the phase detector 21. Operation of the phase detector 21, which also acts as a real load computer, is predicated on a fixed line voltage. Then, if the in-phase component of the current is measured, it can be related to the actual power being delivered by the alternator, according to the formula:

Power (P) = Voltage (E) × Current (I) × Cos $\theta$ where $\theta$ is the phase angle between E and I.

It is the function of each unit 33 of the phase detector to measure the phase angle $\theta$ accurately. While diodes have been used in phase detector circuitry, the switching action of a diode is a function of the voltage across it. If then the voltage signal is not large with respect to the current signal, the switching angle is affected by the current and will result in a false indication of the phase angle. To eliminate this difficulty and the consequent need of high voltage, and also to simplify the circuit, each of the units 33 employs transistors in place of diodes. The transistors may be switched or their gates opened with a small voltage and provide an accurate measure of the phase angle.

In FIG. 2 it will be noted that each of phases I, II and III of the alternator is connected to the load 20 by a conductor 34. A current transformer 35 associated with conductor 34 feeds current through leads 36, having a shunt resistance 37 therein, to a current transformer 38 in the corresponding phase unit 33—I, II or III. Similarly, the voltage component from phase I of the alternator 10 is fed from conductor 34 through a lead 40 to a voltage transformer 41 in phase I unit 33. The outputs of the two transformers 38 and 41 in phase I are interconnected through a resistance 42 and a plurality of transistors 43 so that a high impedance signal may be fed by a conductor 44 into the output side of the phase detector unit 33 for phase II.

As clearly shown in FIG. 2, the circuitry of the phase detector units 33 for phases II and III of the alternator 10 is identical with that just described for phase I, except for the output connections, and corresponding reference numerals have been applied to parts corresponding with those of phase I. The output of phase detector unit II, however, is connected by a conductor 50 with the output of phase detector unit III, which in turn is connected by a lead 51 with a main ground conductor 52 for the entire control circuit. The arrangement of the circuit for each phase detector unit is such that a voltage is impressed across the resistor 42 adjacent the transistors 43 and in the output circuit, and this voltage is a function of the real load of each phase. Interconnecting the individual phase units in the manner described effects an electrical summation or stacking of the individual voltage signals to give a total signal which is a measure of the total load. This total or summed-up signal, which is at a high impedance level, is then ready to be passed to the emitter follower circuit for the next step, which will now be described.

Before referring in detail to FIG. 3, it will be observed that the conductors from phase I and phase III of the alternator 10 are connected by leads 53 with the input of a transformer 54; and the high impedance total signal from the phase detector 21 is fed into the FIG. 3 circuitry by a conductor 55 connected to the output of the phase detector unit 33 for phase I, and a conductor 56 is connected to the ground 52. Thus, the conductors 53, 55 and 56 provide the interconnection between the part of the total circuit shown in FIG. 2 and that shown in FIG. 3, with the leads 53 supplying the necessary primary input power to the transformer 54.

One portion of the secondary or output of the transformer 54 is fed through conductors 57 to the emitter follower circuit 22. One of the principal components of this circuit is a transistor 58 which has its base connected to the output of phase detector 21 through conductor 55 having a resistor 59 therein. Transistor 58 receives its operating power from a suitable rectifying circuit including diodes 60, resistors 61, and a condenser 62, which are fed by the conductors 57. The action of the circuit 22 is to convert the high level impedance signal from the phase detector 21 into a low impedance level signal with no change in voltage by matching the impedance of the three-phase power detectors with the external droop control. The low impedance signal from the emitter follower circuit therefore passes through a conductor 63 to the droop potentiometer 23 and then to the lag or droop network 24 through a conductor 64. This network 24 includes a pair of resistors 65 and a condenser 66 which, together with the adjustable potentiometer 23, provide an adjustable droop control for stabilizing the operation of the system when alternator 10 is hooked up in parallel with one or more other alternators. The signal flowing from the lag network is fed into the preamplifier 30 by a conductor 67 and then into the second stage amplifier 31 through conductors 69. Both of these stages are shown as conventional magnetic amplifiers of the push-pull type and the amplified signal from amplifier 31 finally is fed to the torque motor 32 through leads 68. For the lag or droop method of operation, torque motor 32 will move in a direction to effect a predetermined slowing of the turbine 11.

There are, of course, occasions when it may be desired to operate the alternator 10 singly rather than in parallel, and in such event the droop or lag circuit just described is not usually required. Instead, it is desirable to provide some means for supplementing the action of the isochronous speed control and smoothing out the operation of the system when transient loads are applied to the alternator 10. According to the present invention, this change in operation is accomplished by the switch 25 which is arranged to remove the lag network 24 and droop control from active circuit operation. When the switch 25 is in the position shown in full lines in FIG. 3, the lag network is connected into the circuit to function as described. Movement of the switch to the dotted line position, however, cuts out this network and inserts the lead or anticipation network 26 and adjustable potentiometer 27 into active operation. This network 26 includes a condenser or capacitance 70 in series with a resistor 71 and connected to the adjustable leg of potentiometer 27 by a conductor 72. The low impedance signal from the emitter follower circuit is fed to the lead network through a conductor 73 which is connected to the lowermost contact of switch 25 and a lead 74 going from conductor 63 to the resistance leg of the potentiometer 27.

When the switch 25 is set to provide a lag or droop operation as described above, it is desired to slow down the turbine 11, and the amplified signal from magnetic amplifier 31 is of proper polarity to cause the torque motor 32 to move in the proper direction to attain this result. For single operation with load anticipation, however, it is necessary to speed up the turbine and cancel the load disturbance which would normally slow it down. This is done by reversing the signal flow to the torque motor by moving the switch 25 to the dotted line or down position in FIG. 3. In this position the signal does not go direct to ground, but the motor receives a signal emanating from the anticipation circuit, and due to the change in grounding the windings of the torque motor, the output of the preamplifier 30 is inverted. Consequently, the motor will be moved in the reverse direction from that desired for the lag or droop operation.

From the foregoing description and the showing in FIG. 3, it will be noted and understood that both the droop and lead or anticipation networks include resistance and capacitance. In the droop circuit 24, however, the current is bypassed due to the parallel action of the capacitor 66, whereas in the anticipation network 26 there is an additive effect because the capacitance 70 is in series. Various changes may be made in the circuits herein described and certain features thereof may be employed without others without departing from the present invention or sacrificing any of its advantages.

I claim:
1. An electronic governor control circuit for a turbine driven alternator in which the turbine is provided with governor means for adjusting the fuel supply to said turbine so as to maintain a substantially constant turbine speed and alternator output, comprising:
 (a) circuit means connected to said alternator for sensing and measuring a load applied to said alternator and producing an electrical signal proportional to the load;
 (b) means responsive to said electrical signal for adjusting the fuel supply to said turbine independently of any speed adjustment performed by said governor means;
 (c) a lag network for actuating said adjusting means to reduce the fuel flow to the turbine an amount proportional to said electrical signal when said alternator is coupled in parallel with another alternator;
 (d) an anticipation network in parallel with said lag network for actuating said adjusting means to increase the fuel flow to said turbine an amount proportional to said electrical signal when said alternator is not coupled in parallel with another alternator; and
 (e) means for selectively connecting said networks into the electronic control circuit between said adjusting means and said circuit means.

2. An electronic governor control circuit for a turbine driven alternator in which the turbine is provided with governor means for adjusting the fuel supply to said turbine so as to maintain a substantially constant turbine speed and alternator output, comprising:
 (a) circuit means connected to said alternator for sensing and measuring a load applied to said alternator and producing an electrical signal proportional to said load;
 (b) means responsive to said electrical signal for adjusting the fuel supply to said turbine independently of any speed responsive adjustment performed by said governor means;
 (c) a droop network for actuating said adjusting means to reduce the fuel flow to the turbine an amount proportional to said electrical signal when said alternator is coupled in parallel with another alternator, said droop network including an adjustable potentiometer and a capacitance and resistance through which the current is bypassed;
 (d) an adjustable lead network in parallel with said droop network for actuating said adjustment means to increase the fuel flow to said turbine an amount proportional to said electrical signal when said alternator is not coupled in parallel with another alternator, said lead network having therein an adjustable potentiometer and a capacitance and resistance in series therewith; and
 (e) means for selectively connecting said networks into the electronic control circuit between said adjusting means and said circuit means.

3. An electronic governor control circuit for a turbine driven multiphase alternator in which the turbine is provided with governor means for adjusting the fuel supply to said turbine so as to maintain a substantially constant turbine speed and alternator output, comprising:
 (a) a circuit means having a phase detector for each phase of said alternator, said phase detectors having a transistorized circuit for computing the real load on the respective phase and producing a signal, the signals of the phases being added to make a total signal constituting a measure of the total load;
 (b) an emitter follower receiving the total signal from said phase detectors and converting the same to a low level signal;
 (c) a droop network for receiving said low impedance level signal and for reversing the polarity of the signal when said alternator is coupled in parallel with another alternator; an anticipation network for receiving said low impedance level signal and for maintaining the polarity of the signal when said alternators are not coupled in parallel with another alternator; switch means for selecting one of said two networks to receive the signal from said emitter follower;
 (d) means for amplifying signals supplied thereto from said networks;
 (e) and torque motor means for receiving the signals from said amplifying means for decreasing the fuel flow when said droop network is coupled to said emitter follower and for increasing the fuel flow when said anticipation network is coupled to said emitter follower before said governor means senses a change in speed due to a change in load.

4. An electronic governor control circuit for a turbine driven multiphase alternator in which the turbine is provided with governor means for adjusting the fuel supply to said turbine so as to maintain a substantially constant turbine speed and alternator output, comprising:

(a) a circuit means having a phase detector for each phase of said alternator, said phase detector having a transistorized circuit for computing the real load on the respective phase and producing a signal, the signals of the phases being added to make a total signal constituting a measure of the total load;

(b) an emitter follower receiving the total signal from said phase detectors and converting the same to a low level signal;

(c) a droop network for modifying signals supplied thereto by said emitter follower;

(d) an anticipation network for modifying signals supplied thereto by said emitter follower;

(e) means for amplifying signals supplied thereto from said networks;

(f) torque motor means connected with said governor means and responsive to signals received from said amplifying means to actuate said governor means; and (g) switch means for selecting the network to receive the signals from said emitter follower, said switch means serving to reverse the polarity of the signals supplied to the torque motor when said anticipation network receives signals from said emitter follower to increase the fuel flow to said turbine proportional to the load before said governor means senses a change in speed due to a change in load; and said switch means serving to maintain the polarity of the signals supplied to the torque motor when said droop network receives signals from said emitter follower to decrease the fuel flow to said turbine proportional to the load before said governor means senses a change in speed due to a change in load.

References Cited

UNITED STATES PATENTS

| | | | |
|---|---|---|---|
| 1,675,477 | 7/1928 | Wilson | 290—40 |
| 1,705,688 | 3/1929 | Staege | 290—40 |
| 1,718,336 | 6/1929 | Davis | 290—40 |
| 1,869,134 | 7/1932 | Dietze | 290—40 |
| 2,251,973 | 8/1941 | Beale et al. | 318—18 |
| 2,262,560 | 11/1941 | Bryant | 290—40 |
| 2,470,099 | 5/1949 | Hall | 318—18 X |
| 2,780,733 | 2/1957 | Chyba | 290—40 X |
| 2,790,090 | 4/1957 | Hinde et al. | 290—40 X |
| 2,809,299 | 10/1957 | Hazen | 290—40 |
| 2,866,150 | 12/1958 | Lewis | 290—40 |
| 2,908,826 | 10/1959 | Oldenburger | 290—40 X |
| 2,919,408 | 12/1959 | Brown | 324—142 |
| 3,110,817 | 11/1963 | Frederick | 290—40 |

OTHER REFERENCES

Control System Theory, Ronald, 1962, TJ 216L3, Lago et al.

Transistor Manual, General Electric Co., 1962.

BENJAMIN DOBECK, *Primary Examiner.*

ORIS L. RADER, G. SIMMONS, *Assistant Examiners.*